United States Patent
Kobayashi

(10) Patent No.: US 7,667,763 B2
(45) Date of Patent: Feb. 23, 2010

(54) IMAGE PICKUP EQUIPMENT AND METHOD

(75) Inventor: Koji Kobayashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 652 days.

(21) Appl. No.: 11/484,678

(22) Filed: Jul. 12, 2006

(65) Prior Publication Data

US 2007/0013782 A1    Jan. 18, 2007

(30) Foreign Application Priority Data

Jul. 13, 2005   (JP)  ............................. 2005-204411

(51) Int. Cl.
*G03B 7/00* (2006.01)
*H04N 5/235* (2006.01)

(52) U.S. Cl. .................... 348/362; 348/364; 348/221.1; 348/229.1; 348/241; 348/243

(58) Field of Classification Search ............. 348/221.1, 348/362, 222.1, 226.1, 241, 243, 207.99, 348/333.01, 333.02, 248, 254–256, 229.1; 358/482, 483

See application file for complete search history.

(56) References Cited

U.S. PATENT DOCUMENTS 6,614,996 B2 *  9/2003  Okisu et al. .................... 396/63
6,747,696 B1 *  6/2004  Nakata et al. ................ 348/243
7,463,295 B2 * 12/2008  Asada et al. ................. 348/254

FOREIGN PATENT DOCUMENTS

JP      5-7336 A    1/1993
JP   2004-363726 A  12/2004

* cited by examiner

*Primary Examiner*—Yogesh K Aggarwal
(74) *Attorney, Agent, or Firm*—Birch, Stewart, Kolasch & Birch, LLP

(57) ABSTRACT

A digital still camera records image data by picking up an image of an object. One mode is set among plural photographing modes including a standard photographing mode and a portrait mode adapted to an image containing an abrupt change in gradation. An optimized exposure amount is acquired according to brightness derived from the image data. When the portrait mode is set, portrait mode image data is acquired by setting exposure lower than the optimized exposure amount. The image data is processed in gradation conversion by use of first or second gamma conversion table. The first gamma conversion table is used for the standard photographing mode. The second gamma conversion table is used for the portrait mode, predetermined to extend a dynamic range of the image data after the gradation conversion in comparison with the first gamma conversion table, to process the portrait mode image data in gradation conversion.

5 Claims, 9 Drawing Sheets

ELECTRONIC SHUTTER
SPEED (1/sec)

IMAGE PICKUP EQUIPMENT AND METHOD

BACKGROUND OF THE INVENTION

1. Field of the Invention

The present invention relates to an image pickup equipment and method. More particularly, the present invention relates to an image pickup equipment and method in which degradation of an image can be prevented specifically when portions of high brightness and low brightness are included in each image.

2. Description Related to the Prior Art

A digital still camera is widely used as image pickup equipment, in which a CCD image sensor picks up an object image photoelectrically as image pickup device. However, a dynamic range of a digital still camera is smaller than that of a photographic camera for use with silver halide photosensitive material. An image picked up has comparatively low clarity and low gradation. To pick up and record the image of an object of low brightness, an image pickup signal output by the image pickup device is amplified at a predetermined coefficient to raise gain, so the image with clarity and high gradation can be acquired. However, this is unsuitable if portions of high the brightness and the low the brightness are included in the image, because of occurrence of local overexposure in the image due to amplification of the image pickup signal over a reproducible range of the gradation when an object of high brightness is photographed.

JP-A 5-007336, the image pickup equipment or digital camera is disclosed in which an object is photographed for plural times at different lengths of exposure time, and the obtained images are synthesized virtually to extend a dynamic range of the image pickup signal. JP-A 2004-363726 discloses the image pickup equipment in which a gamma conversion table is determined according to a gradation level of the brightness of the image obtained by the image pickup device or CCD, and the gradation level is converted according the gamma conversion table so that an gradient of a characteristic of an output and input of the gradation level is determined high in a principal object range of low brightness assigned to a principal object. The gradient of a characteristic of an output and input of the gradation level is determined high in a principal object range of high brightness.

However, the image pickup equipment or digital camera in JP-A 5-007336 synthesizes the image of plural periods after consecutively photographing the same scene at different exposure levels. This idea is not suitable for a moving object, such as a human being. In the image pickup equipment of JP-A 2004-363726, the gamma conversion table is changed according to evaluating information of high brightness. However, there is a problem in complexity in controlling the exposure because determination of optimized exposure is required, to lower a speed of processing.

SUMMARY OF THE INVENTION

In view of the foregoing problems, an object of the present invention is to provide an image pickup equipment and method in which degradation of an image can be prevented specifically when portions of high brightness and low brightness are included in each image.

In order to achieve the above and other objects and advantages of this invention, image pickup equipment for recording image data by use of an imaging device for picking up an image of an object is provided. A mode selector sets a selected one of plural photographing modes including a standard photographing mode and a portrait mode. A memory stores first and second gamma conversion tables for gradation conversion, the first gamma conversion table being used for the standard photographing mode, and the second gamma conversion table being used for the portrait mode, predetermined to extend a dynamic range of the image data characteristically in comparison with the first gamma conversion table. An image processor processes the image data in gradation conversion by use of the first or second gamma conversion table. An AE evaluator acquires an optimized exposure amount according to brightness derived from the image data. There is an exposure control unit for control of an exposure amount of the imaging device. A controller, when the portrait mode is set, causes the exposure control unit to set exposure lower than the optimized exposure amount being obtained, and controls the image processor to process portrait mode image data in gradation conversion according to the second gamma conversion table, the portrait mode image data being acquired by use of the imaging device and by setting the exposure lower.

The second gamma conversion table has a characteristic of setting brightness high at a facial portion of a human image.

A gamma value according to the second gamma conversion table is smaller than a gamma value according to the first gamma conversion table.

Furthermore, a shutter button is operable by depression, for causing the controller to stand by upon halfway depression, and for causing the controller to record the image data upon full depression. A display panel is controlled by the controller, for displaying an image. When the portrait mode is set and when the shutter button remains unshifted, an image of image data of the object picked up at the optimized exposure amount is displayed on the display panel in a state processed in the gradation conversion according to the first gamma conversion table. When the shutter button is depressed halfway, an image of the portrait mode image data in an under exposed state is displayed on the display panel in a state processed in the gradation conversion according to the second gamma conversion table.

Furthermore, an image sensor picks up the image. An aperture stop mechanism causes entry of object light on the image sensor. The controller includes a corrector for constituting the exposure control unit, and for, when the portrait mode is set, correcting the optimized exposure amount at a lower level, to obtain a corrected exposure amount. A determiner determines at least one of an electronic shutter speed and an aperture stop value according to one of the optimized exposure amount and the corrected exposure amount associated with a selected one of the standard photographing mode and the portrait mode, so as to control at least one of the image sensor and the aperture stop mechanism.

Also, an image pickup method of recording image data by picking up an image of an object is provided, including setting a selected one of plural photographing modes including a standard photographing mode and a portrait mode. An optimized exposure amount is acquired according to brightness derived from the image data. When the portrait mode is set, specific mode image data is acquired by setting exposure lower than the optimized exposure amount being obtained. The image data is processed in gradation conversion by use of first or second gamma conversion table, the first gamma conversion table being used for the standard photographing mode, and the second gamma conversion table being used for the portrait mode, predetermined to extend a dynamic range of the image data after the gradation conversion in comparison with the first gamma conversion table, to process the specific mode image data in gradation conversion.

Furthermore, a computer executable program for recording image data by picking up an image of an object is provided, including mode selecting code for setting a selected one of plural photographing modes including a standard photographing mode and a portrait mode adapted to an image containing an abrupt change in gradation. Exposure evaluating code is for acquiring an optimized exposure amount according to brightness derived from the image data. Data acquiring code is for, when the portrait mode is set, acquiring specific mode image data by setting exposure lower than the optimized exposure amount being obtained. Image processing code is for processing the image data in gradation conversion by use of first or second gamma conversion table, the first gamma conversion table being used for the standard photographing mode, and the second gamma conversion table being used for the portrait mode, predetermined to extend a dynamic range of the image data after the gradation conversion in comparison with the first gamma conversion table, to process the specific mode image data in gradation conversion.

Also, a user interface for recording image data by picking up an image of an object is provided. A mode selecting region is for setting a selected one of plural photographing modes including a standard photographing mode and a portrait mode adapted to an image containing an abrupt change in gradation. An exposure evaluating region is for acquiring an optimized exposure amount according to brightness derived from the image data. A data acquiring region is for, when the portrait mode is set, acquiring specific mode image data by setting exposure lower than the optimized exposure amount being obtained. An image processing region is for processing the image data in gradation conversion by use of first or second gamma conversion table, the first gamma conversion table being used for the standard photographing mode, and the second gamma conversion table being used for the portrait mode, predetermined to extend a dynamic range of the image data after the gradation conversion in comparison with the first gamma conversion table, to process the specific mode image data in gradation conversion.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
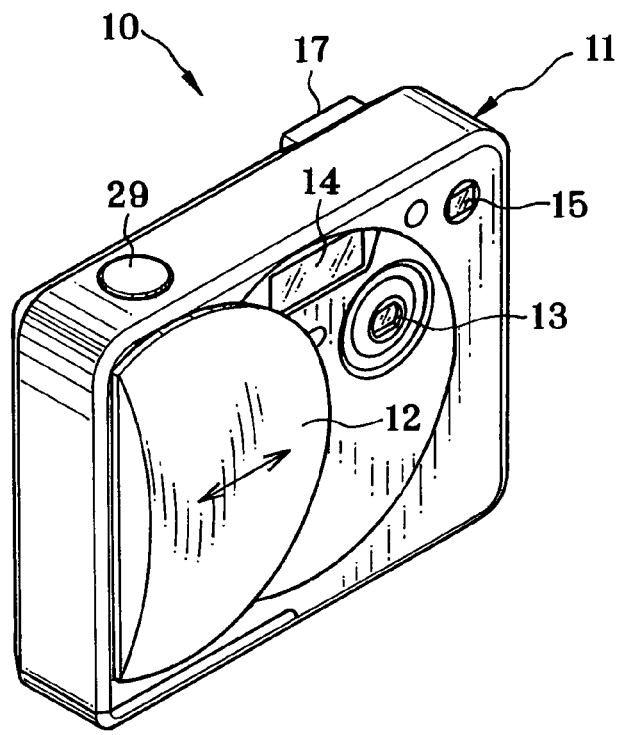
FIG. 1 is a perspective view illustrating a digital still camera.

In FIG. 1, a digital still camera 10 as image pickup equipment has a camera body 11. A lens barrier 12 is slidable on a front of the camera body 11. A photographing lens system 13 and a flash light source 14 appear when the lens barrier 12 is slid to an open position of FIG. 1. A viewfinder objective window 15 is disposed on the front of the camera body 11 to constitute an optical viewfinder.

The lens barrier 12 is constructed also as a mechanism with a switch of a power source. When the lens barrier 12 slid to the open position, the power source of the camera body 11 is turned on. When the lens barrier 12 is slid to the closed position to cover the photographing lens system 13 and the flash light source 14, the power source of the camera body 11 is turned off.

Figure 2:
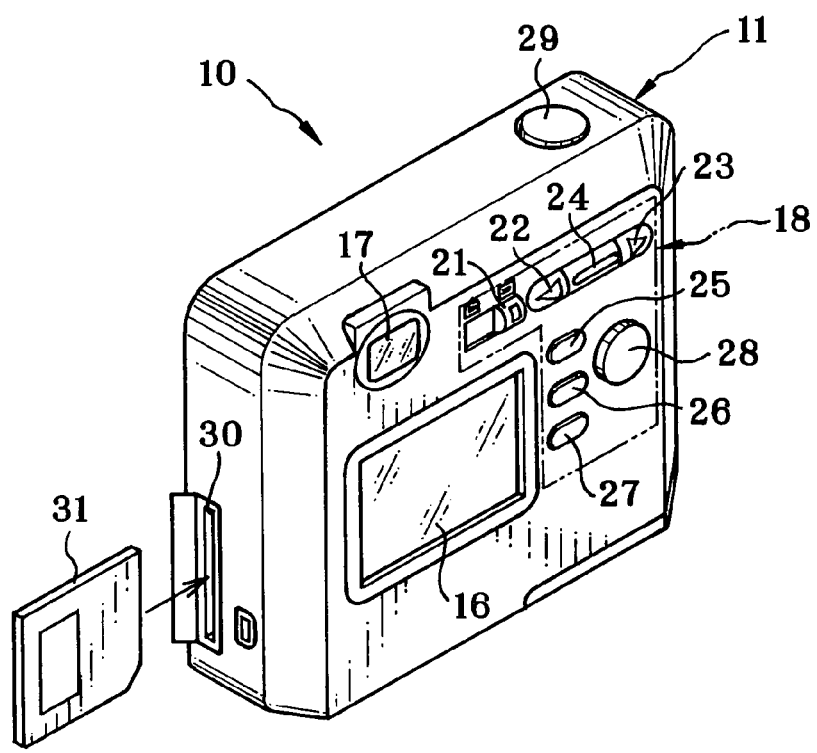
FIG. 2 is a rear perspective view illustrating the digital still camera.

In FIG. 2, the rear of the camera body 11 has an LCD display panel 16, a viewfinder eyepiece window 17, and a keypad 18 as a user interface. The viewfinder eyepiece window 17 is included in the optical viewfinder. The keypad 18 includes various keys or buttons. The display panel 16 displays a live image, a playback image, and patterns for menus of settings.

The keypad 18 includes a mode switch 21, a reverse button 22, a forward button 23, a zoom button 24, a menu button 25, a cancellation button 26, a display button 27, and a mode selection dial 28 as a mode selector.

The mode switch 21 is slid to change over between the playback mode and photographing modes. The forward button 23 is depressed in the playback mode to change image frames successively one after another. The reverse button 22 is depressed in the playback mode to change those in reverse one after another. The zoom button 24 is shifted up or down to change the magnification optically for photographing.

The menu button 25 is depressed for indicating the menu pattern in the display panel 16. The cancellation button 26 is used and depressed for canceling operation for setting in the menu pattern, or for returning to a previous image pattern. The display button 27 is used for turning on and off the display panel 16.

Examples of photographing modes preset in the digital still camera 10 include a portrait mode, an anti-shake mode for preventing influence of camera shake, a far distance mode for landscapes, a night mode, and a natural photo mode for photographing with high photo sensitivity. The mode selection dial 28 is rotated and stopped for setting a desired one of the photographing modes.

The portrait mode or portrait photographing mode is a mode suitable to photographing a human portrait. A dynamic range for the portrait mode is extended in comparison with the other modes. As will be described later, the exposure amount is set in a manner of under-exposure, for example lower by 0.6 EV. A second gamma conversion table is used in place of the first, to process image data in the gamma conversion.

A shutter button 29 is disposed on an upper face of the camera body 11. The shutter button 29 is operable for two steps of depression, halfway and full. When the shutter button 29 is depressed halfway, exposure, focusing and the like are adjusted to stand by for photographing. When the shutter button 29 is depressed fully, an image is photographed.

A memory card slot 30 is formed in a lateral panel of the camera body 11. A memory card 31 is removably inserted in the memory card slot 30 as a recording medium or storage for storing image data.

Figure 3:
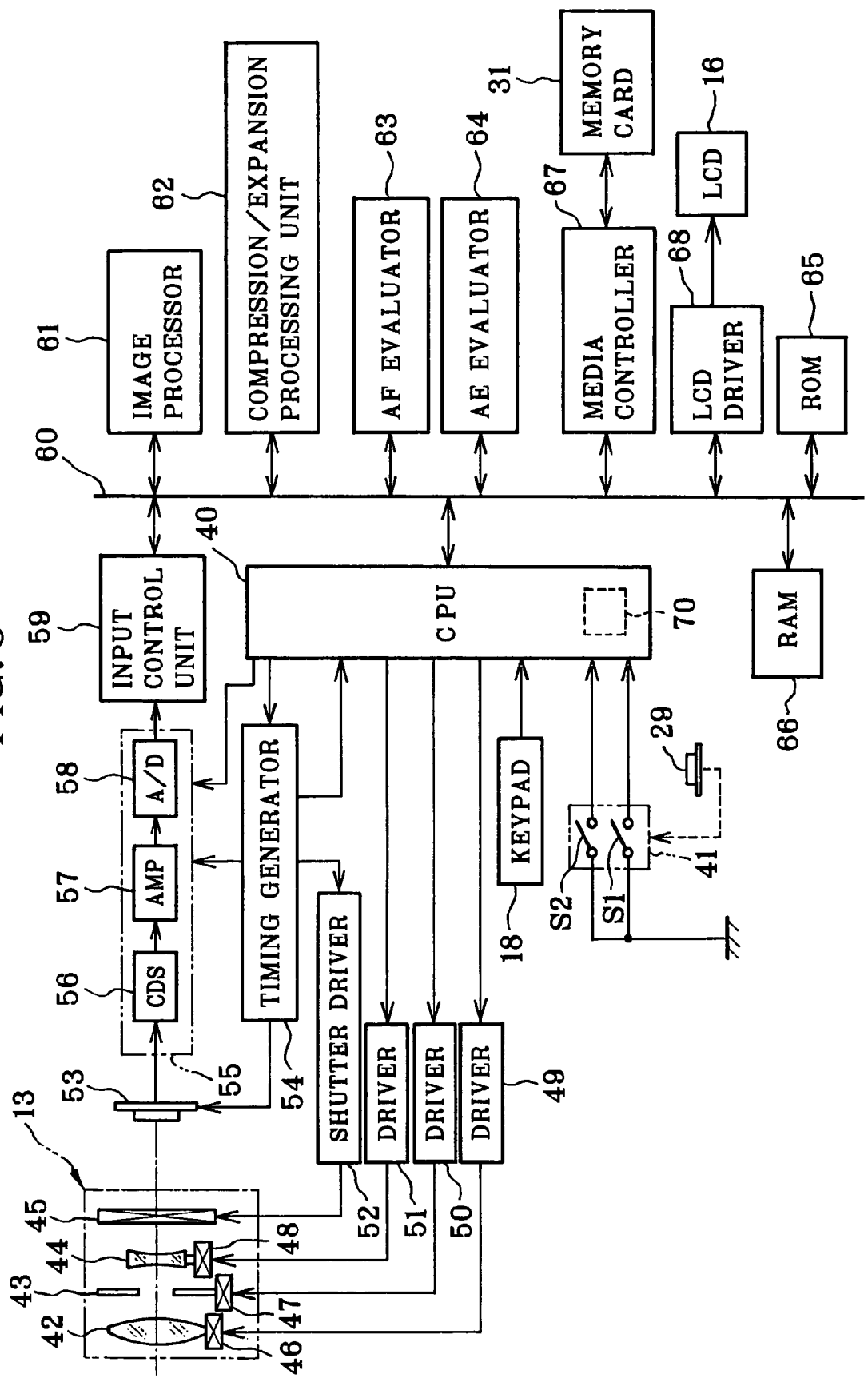
FIG. 3 is a block diagram schematically illustrating circuit arrangement of the digital still camera.

Circuit arrangement of the digital still camera 10 is described next. In FIG. 3, a CPU as controller 40 is incorporated in the digital still camera 10 to control camera elements. A switch assembly 41 and the keypad 18 are connected with the CPU 40. When the switch and buttons 21-28 in the keypad 18 are operated, the CPU 40 outputs command signals mapped with the switch and buttons 21-28 for operation.

The switch assembly 41 includes shutter switches S1 and S2 to be turned on and off upon depression of the shutter button 29. When the shutter button 29 is depressed halfway, the shutter switch S1 is turned on. When the shutter button 29 is fully depressed after the halfway depression, the shutter switch S2 is turned on. An ON signal is sent to the CPU 40 when both of the shutter switches S1 and S2 are turned on. The CPU 40 executes a standby sequence ready for photographing when the shutter switch S1 is turned on, and executes the image pickup when the shutter switch S2 is turned on.

The photographing lens system 13 includes a zoom lens 42, an aperture stop mechanism 43, a focusing lens 44, and a shutter mechanism 45. A zoom motor 46 drives the zoom lens 42. An aperture stop motor 47 drives the aperture stop mechanism 43. A focusing motor 48 drives the focusing lens 44.

There is a driver 49 at which the zoom motor 46 is connected with the CPU 40. When the keypad 18 is operated for zooming, the CPU 40 causes the driver 49 to drive the zoom motor 46. The zoom lens 42 is moved in the optical axis direction, to change the magnification optically for photographing.

A driver 50 is connected with the aperture stop motor 47. The CPU 40 controls the driver 50 to drive the aperture stop motor 47. A CCD image sensor 53 as image pickup device is disposed behind the photographing lens system 13. A diameter of openness of the aperture stop mechanism 43 is changed to adjust a light amount of light incident to the CCD 53. While a live image is being picked up without operating the shutter button 29, the diameter of the aperture stop mechanism 43 is adjusted according to a change in the object brightness. When the shutter button 29 is depressed halfway, the diameter of the openness is determined upon the halfway depression according to the aperture stop value or f-number determined by the AE evaluation process.

A driver 51 is connected with the focusing motor 48. The CPU 40 controls the driver 51 to drive the focusing motor 48. The focusing lens 44 is moved in the optical axis direction, to adjust focusing. In the photographing mode, while the shutter button 29 is not depressed, focusing of the focusing lens 44 is adjusted by following a change in the object distance. When the shutter button 29 is depressed halfway, focusing of the focusing lens 44 is locked in an in-focus state at the object upon the half depression.

A shutter driver 52 is connected with the shutter mechanism 45. A timing generator (TG) 54 is connected with the shutter driver 52. The CPU 40 controls the timing generator 54 and causes the shutter driver 52 to output a mechanical shutter drive signal. The shutter mechanism 45 is driven by this signal. In a normal state, a shutter blade of the shutter mechanism 45 is open. When exposure of the CCD 53 is completed, the shutter blade is closed, to block entry of object light to the CCD 53 to prevent occurrence of smear strips. Note that it is possible that no shutter mechanism is used, because the use of an electronic shutter can be effective.

The CCD 53 is disposed behind the photographing lens system 13 as described above. Object light passed through the photographing lens system 13 becomes incident upon a receiving surface of the CCD 53. As the CCD 53 is driven by a driving signal generated by the timing generator 54, and outputs an image signal of an analog form for the photographed image.

The CCD 53 can operate as an electronic shutter. The timing generator 54 sends the CCD 53 an electronic shutter pulse, which discharges the stored charge in the CCD 53 to delete an image, so as to adjust the charge storing time. Scheduling of transmitting the electronic shutter pulse is adjusted to determine a shutter speed of the electronic shutter. When the shutter button 29 is depressed fully in the photographing mode, the CCD 53 reads the charge stored by exposure, and outputs an image pickup signal.

An analog signal processor 55 is connected with the CCD 53, and supplied with an output image pickup signal. The analog signal processor 55 includes a correlated double sampling circuit (CDS) 56, an amplifier 57, and an A/D converter 58, and supplied with a sync pulse by the timing generator 54, and synchronized with reading of electric charge in the CCD 53.

The CDS 56 eliminates components of electric noise from the image pickup signal according to correlation double sampling. The amplifier 57 amplifies the image pickup signal with a gain according to photo sensitivity determined by the CPU 40. The A/D converter 58 converts the image pickup signal from the amplifier 57 into a digital form, so as to output image data.

An input control unit 59 is supplied with the image data output by the A/D converter 58. A data bus 60 is connected with the input control unit 59, which controls inputting of image data to the data bus 60. Various elements are connected with the data bus 60, including an image processor 61, a compression/expansion processing unit 62, an AF evaluator 63, an AE evaluator 64, a ROM 65 as a memory, a RAM 66, a media controller 67, and an LCD driver 68 as well as the CPU 40 and the input control unit 59. The CPU 40 controls those elements by use of the data bus 60. Transmission and reception of data is possible between the CPU 40 and those circuits.

The image processor 61 processes image data for various settings, namely for gamma conversion to convert gradation, Y-C conversion, and the like. The compression/expansion processing unit 62 compresses the image data. In the playback mode, the compression/expansion processing unit 62 expands compressed image data read from the memory card 31.

The AF evaluator 63 to focus the photographing lens system 13 is supplied with image data from the input control unit 59, and derives and evaluates contrast of an image being picked up, and sends information of the contrast to the CPU 40. The CPU 40 refers to the contrast information, and causes the driver 51 to drive the focusing motor 48 to maximize the contrast in the image being picked up.

The AE evaluator 64 measures light photometrically in image data from the input control unit 59 according to the center weighted photometry. Specifically, gradation values of brightness of numerous pixels are multiplied by coefficients for weighting in a manner of weighting the center of the image to a high extent, to determine AE cumulative value. Note that other methods of photometry may be used instead of the center weighted photometry, for example, spot photometry. The AE evaluator 64 receives information of the present exposure amount, and determines an optimized exposure amount from a difference between the target brightness value and the average of cumulative AE value. Information of the optimized exposure amount is sent to the CPU 40.

The CPU 40 receives information of an optimized exposure amount from the AE evaluator 64. If a selected photographing mode is different from the portrait mode, the aperture stop value or f-number and the electronic shutter speed are determined according to the optimized exposure amount on the basis of an exposure program chart which will be described. If the selected photographing mode is the portrait mode, then a corrector 70 in the CPU 40 sets a determined exposure amount at a value 0.6 EV lower than the optimized exposure amount.

Figure 4:
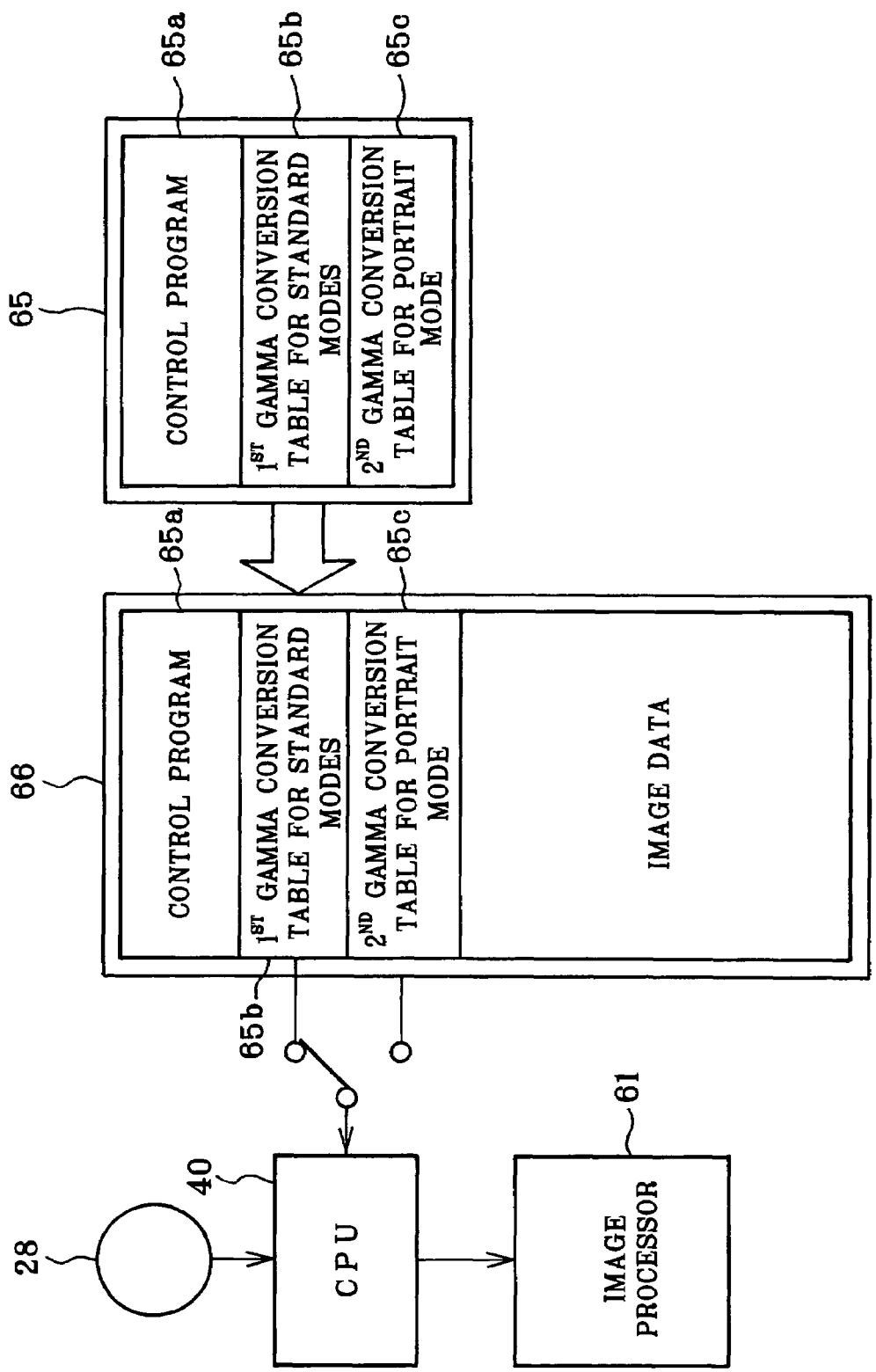
FIG. 4 is a block diagram schematically illustrating a step of selectively setting gamma conversion tables.

An example of the ROM 65 is FROM or flash memory in which data is rewritable. In FIG. 4, the ROM 65 stores information including a control program 65a having a control program portion for control of various elements under the CPU 40, and an exposure control program portion corresponding to plural exposure program charts for determining combinations of the electronic shutter speed and aperture stop. Also, the ROM 65 stores a first gamma conversion table 65b for standard modes, and a second gamma conversion table 65c for the portrait mode to extend a dynamic range.

The ROM 65 is a data table for use when the selected mode is different from the portrait mode, for example, an anti-shake mode for preventing influence of camera shake, a far distance mode for landscapes, a night mode, and a natural photo mode. The second gamma conversion table 65c for an extended dynamic range is a data table for use when the selected mode is the portrait mode.

An example of the RAM 66 is an SDRAM of which reading and writing are possible at high speed. Various data are temporarily written in the RAM 66, including the control program 65a, the first and second gamma conversion tables 65b and 65c, displayable image data to display on the LCD display panel 16, recordable image data to write to the memory card 31, and the like.

In FIG. 4, the CPU 40 writes the control program 65a, the first gamma conversion table 65b for the standard use and the second gamma conversion table 65c for the large dynamic range, to the RAM 66 in a temporary manner. The CPU 40 sets a selected one of the photographing modes according to a selection signal output by setting the mode selection dial 28. If a selected mode is different from the portrait mode, then the CPU 40 selects the first gamma conversion table 65b, and controls the image processor 61 according to the first gamma conversion table 65b to process the image data for gamma conversion.

When the selected mode is the portrait mode, the second gamma conversion table 65c is selectively used for gamma conversion. The image processor 61 is controlled to process the image data according to the second gamma conversion table 65c.

Figure 5:
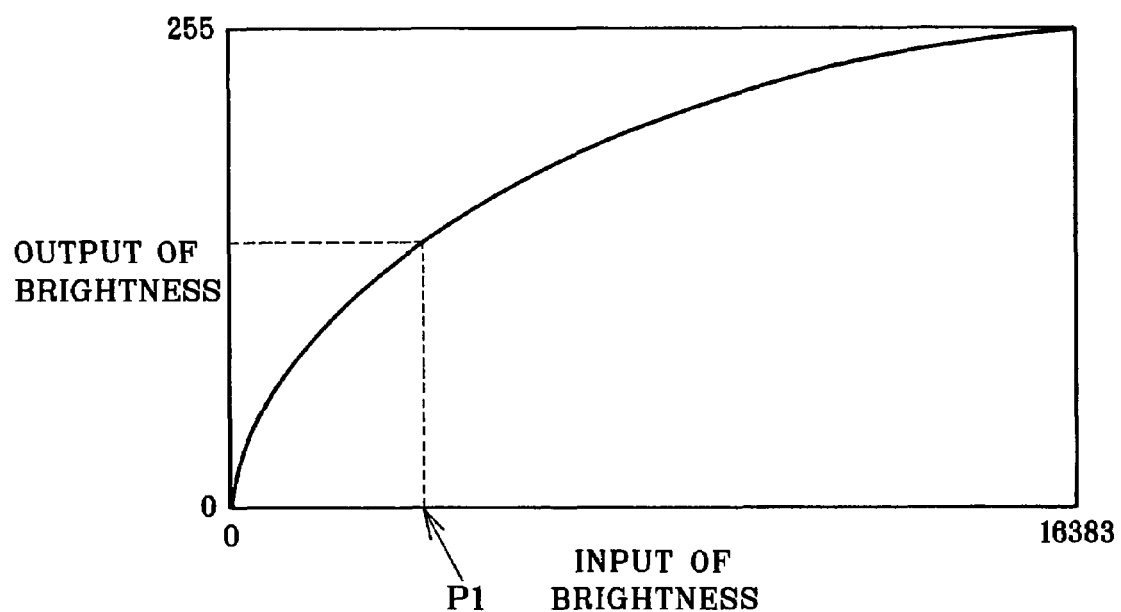
FIG. 5 is a graph illustrating a curve of a first gamma conversion table.
Figure 6:
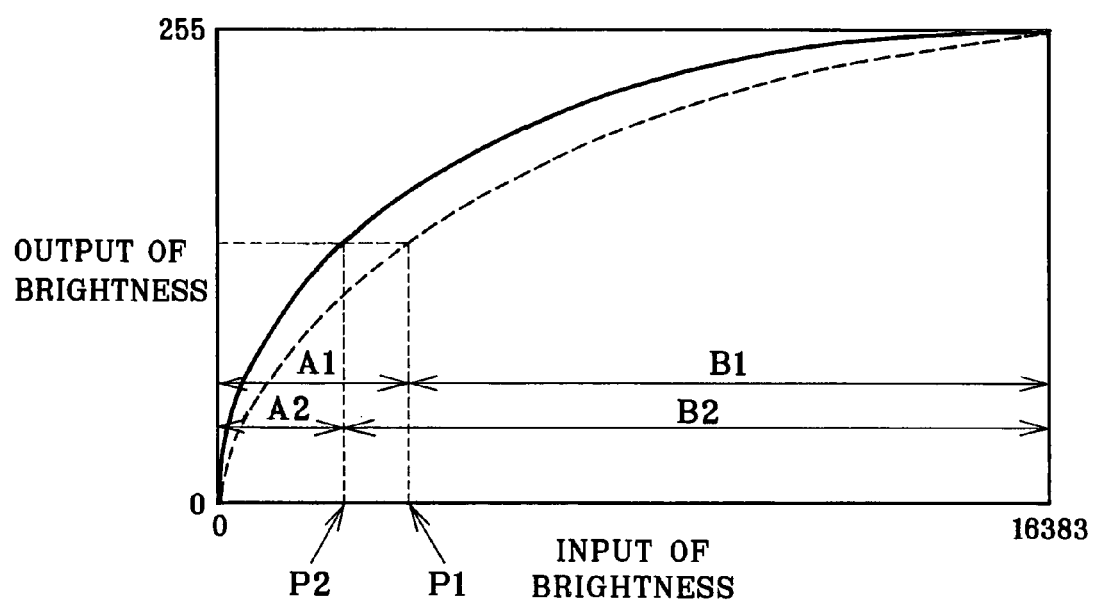
FIG. 6 is a graph illustrating a curve of a second gamma conversion table.

In FIG. 5, a curve expressing the first gamma conversion table 65b is illustrated. In FIG. 6, a curve expressing the second gamma conversion table 65c for an extended dynamic range is illustrated. In FIGS. 5 and 6, an input brightness level is taken on a horizontal axis, namely a gradation value of 14 bits of brightness after the A/D conversion. An output brightness level is taken on a vertical axis, namely a gradation value of 8 bits of brightness after the gamma conversion. The gamma conversion converts 14-bit image data after the A/D conversion to 8-bit image data. Note that a value of gamma according to the second gamma conversion table 65c is smaller than a value of gamma according to the first gamma conversion table 65b.

Figure 7:
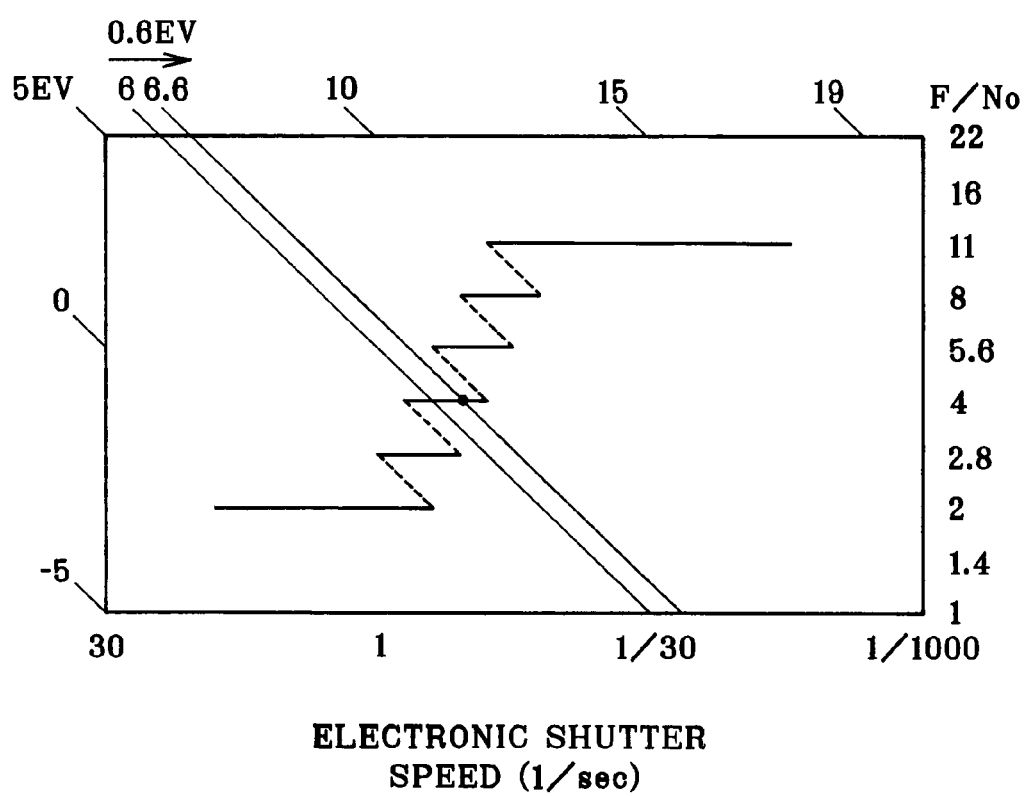
FIG. 7 is a graph illustrating an exposure program chart for the portrait mode.

As described heretofore, the exposure amount in the portrait mode is determined lower than optimized exposure by 0.6 EV. For example, let optimized exposure be 6 EV in normal photographing modes other than the portrait mode. The exposure amount in the portrait mode is determined 6.6 EV by the corrector 70. The aperture stop value or f-number and electronic shutter speed are determined according to the exposure program chart of FIG. 7. Image data obtained by the image pickup is processed for gamma conversion according to the second gamma conversion table 65c of FIG. 6.

In FIG. 6, let P be a target brightness level described above. Let P2 be a brightness level corresponding to the large brightness level P but after exposure correction in the portrait mode. Let A1 be a gradation range from the input brightness level 0 to the target brightness level P1. Let B1 be a gradation range from the target brightness level P1 to the input brightness level 16,383. Let A2 be a gradation range from the input brightness level 0 to the target brightness level P2. Let B2 be a gradation range from the target brightness level P2 to the input brightness level 16,383. A1, A2, B1 and B2 are so determined that (B1/A1):(B2/A2)=100:150. Assuming that the dynamic range in any mode other than the portrait mode is 100%, the dynamic range in the portrait mode is 150%.

The corrector 70 determines the exposure in the portrait mode lower by 0.6 EV than optimized exposure. In the second gamma conversion table 65c, a gradient of the curve of the characteristic between the input and output is greater than the first gamma conversion table 65b in the region near to the brightness value P2. The gradation level of the region near to the brightness value P2 and short of the brightness is raised by the second gamma conversion table 65c. Thus, a change in the gradation value can be set lower near to the brightness value P2. Consequently, occurrence of local overexposure can be suppressed in photographing a human face in the portrait mode specifically at his or her forehead, in contrast with shortcomings in the known technique in which local overexposure is likely to occur at a forehead of a human face of a portrait.

The media controller 67 controls writing and reading of data with the memory card 31. The image data is processed in the image processor 61 and compressed in the compression/expansion processing unit 62, and sent to the media controller 67 and written to the memory card 31. For playback, the media controller 67 reads image data from the memory card 31, and sends the image data to the compression/expansion processing unit 62 for expansion. Then the expanded image data is stored in the RAM 66 in a temporary manner.

The LCD driver 68 reads image data from the RAM 66, and drives the LCD display panel 16 according to the image data. The display panel 16 displays a live image picked up by the CCD 53, or a recorded image read from the memory card 31.

Figure 8:
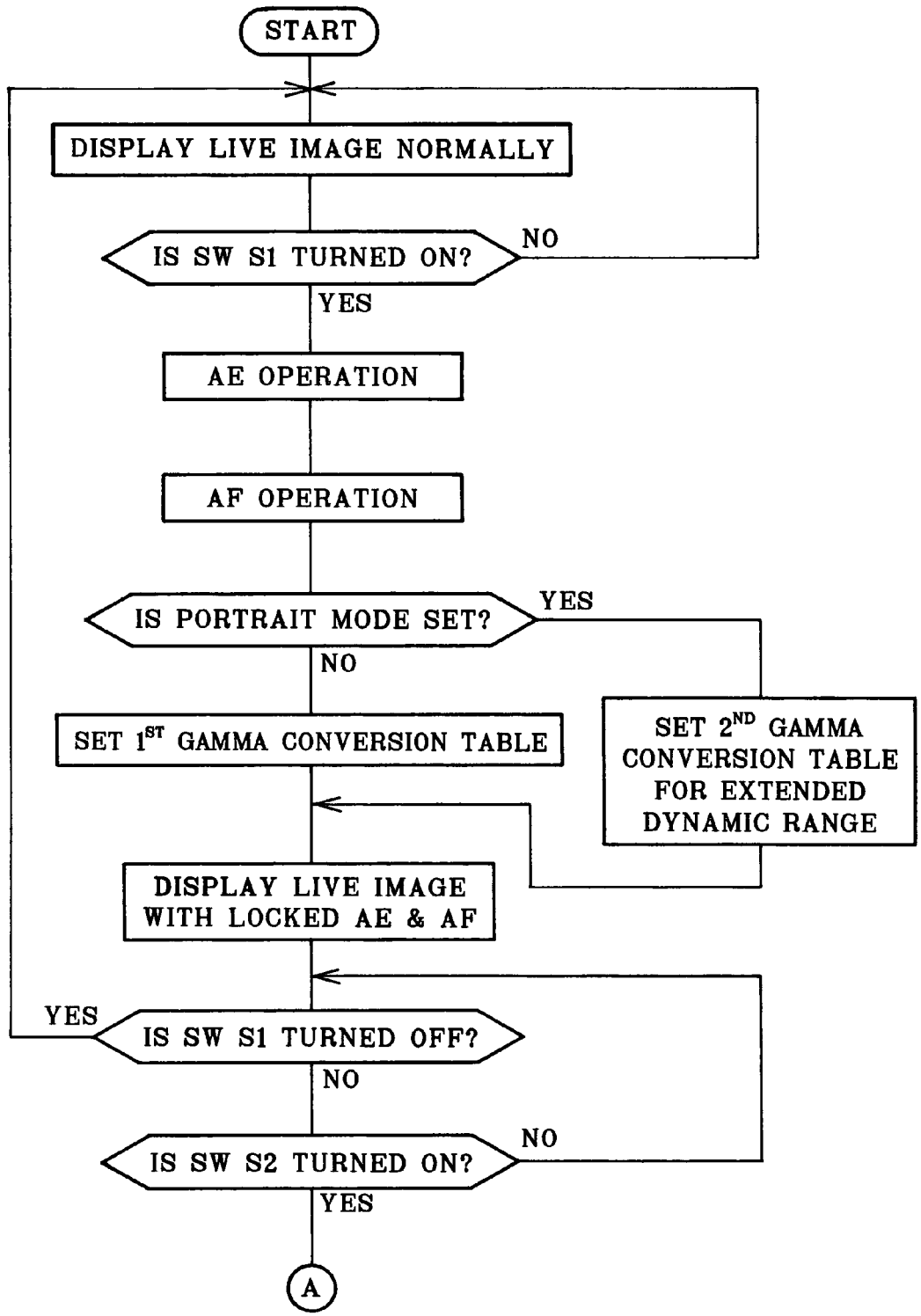
FIG. 8 is a flow chart illustrating part of image pickup operation of the digital still camera.
Figure 9:
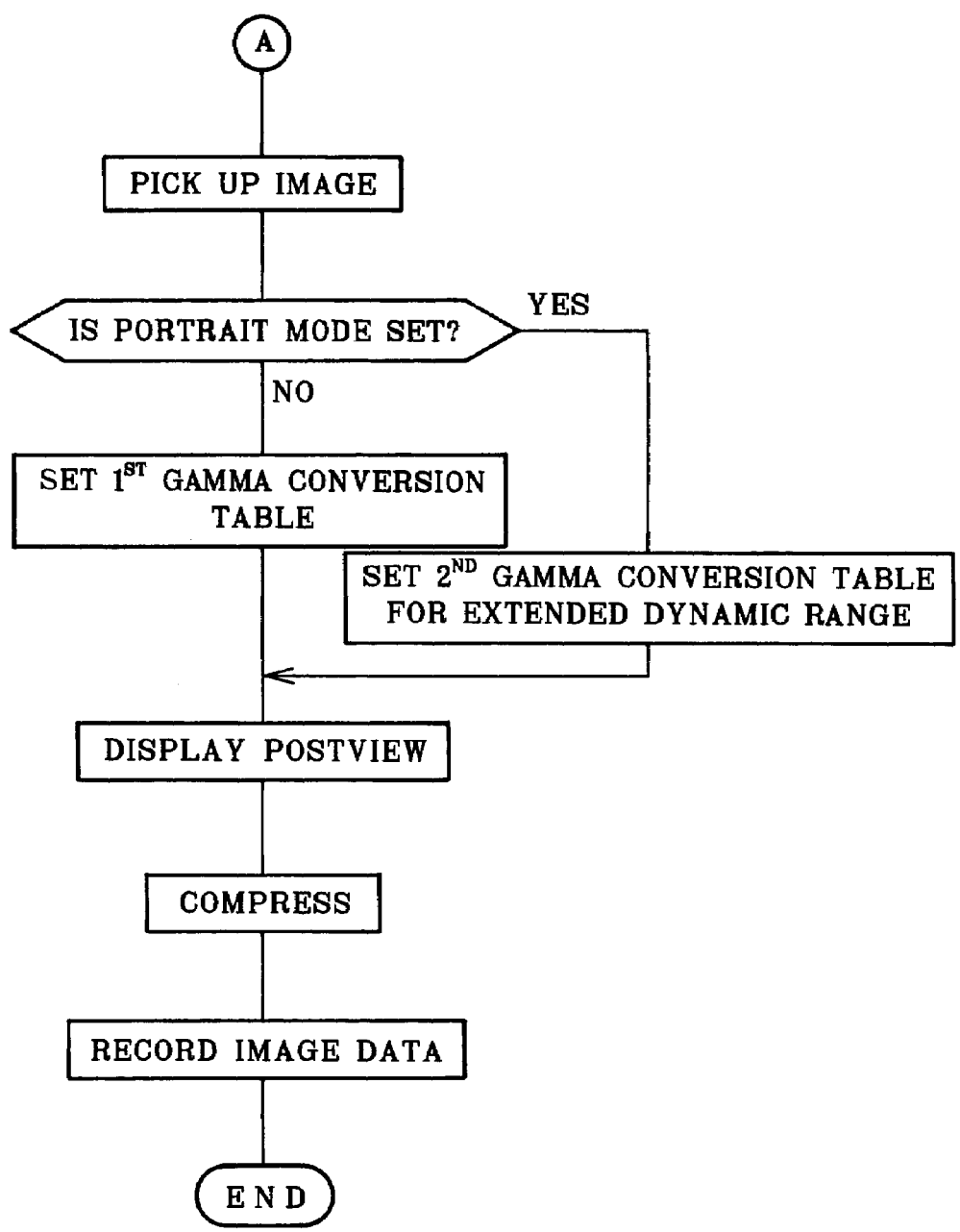
FIG. 9 is a flow chart illustrating a remaining part of the image pickup operation.

Operation of photographing in the digital still camera 10 is described by referring to FIGS. 8 and 9. A power source circuit in the digital still camera 10 is turned on, to set a photographing mode. The CPU 40 controls the LCD driver to cause the display panel 16 to display a live image of a standard manner. The live image is an image processed in the gamma conversion according to the first gamma conversion table 65b and with a standard dynamic range of 100%. The live image is acquired as an image picked up at a predetermined interval of time, and is displayed on the display panel 16 in a consecutive manner.

Figure 10:
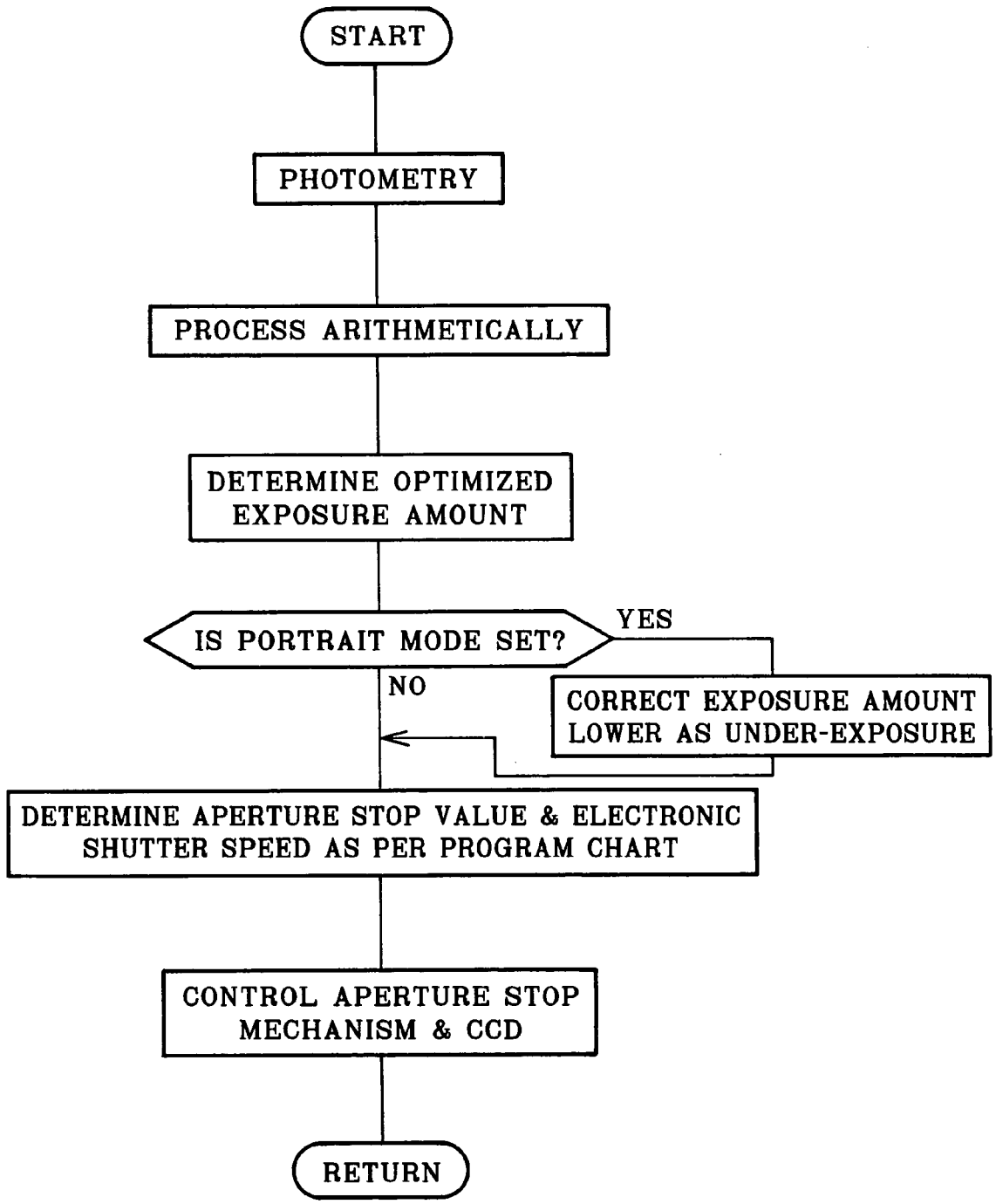
FIG. 10 is a flow chart illustrating an AE operation.

The CPU 40 checks whether the switch S1 is turned on. If the switch S1 is found not turned on, then the sequence returns to a step of displaying the live image. If the switch S1 is found turned on, AE and AF operation is effected. In FIG. 10, a flow with the AE operation is illustrated.

At first, the CPU 40 controls the AE evaluator 64 to measure light according to center weighted photometry. The AE evaluator 64 evaluates the present exposure amount, finds a difference between an average of the AE cumulative value and the target brightness level, and acquires an exposure amount where the average becomes equal to the target brightness level. This is an optimized exposure amount, which is sent to the CPU 40.

Then the CPU 40 checks whether the portrait mode or portrait photographing mode is set or not. If it is detected that the portrait mode is not set, then the CPU 40 determines the aperture stop value and electronic shutter speed mapped with the optimized exposure amount according to an exposure program chart for the photographing modes.

If the selected mode is found the portrait mode, then the optimized exposure amount is corrected by the corrector 70 to set an under-exposure amount. The aperture stop value and electronic shutter speed are determined according to the exposure amount after the correction according to the exposure program chart of FIG. 7, for example the amount lower by 0.6 EV.

The CPU 40 controls the aperture stop mechanism and the CCD image sensor according to the aperture stop value and the electronic shutter speed. The AE step is terminated.

Then the AF evaluation is effected in addition to the AE evaluation. The CPU 40 acquires contrast information of the image from the AF evaluator 63, controls the driver 51 to maximizing the contrast of the image, and drives the focusing motor 48 to move the focusing lens 44 to an in-focus position.

After the AE and AF operation, the switch S1 is kept turned on as a locking state of AE and AF. The CPU 40 checks whether a selected photographing mode is the portrait mode. If the selected photographing mode is found different from the portrait mode, then the first gamma conversion table 65b is selectively set for gamma conversion. If the selected photographing mode is found the portrait mode, then the second gamma conversion table 65c is selectively set for gamma conversion.

After this, the CPU 40 controls the image processor 61 to process image data in gamma conversion according to the first or second gamma conversion table 65b or 65c. Also, the CPU 40 processes the image data in Y-C conversion, and causes the LCD display panel 16 to display an image in a state where the AE and AF are locked. The live image is acquired as an image picked up at a predetermined interval of time while the AE and AF are locked, and kept indicated on the display panel 16 in a consecutive manner until the switch S1 is turned off or until the switch S2 is turned on.

The CPU 40 checks whether the switch S1 is turned off. If the switch S1 is found turned off, then the locked state of AE and AF is undone, to enable adjustment of exposure and focusing. If the second gamma conversion table 65c is selected, the first gamma conversion table 65b is set in place of the second gamma conversion table 65c for gamma conversion. The sequence returns to displaying a live image in a normal manner.

If the switch S1 is found not turned off, then the CPU 40 checks whether the switch S2 is turned on. If the switch S2 is found not turned on, then the operation returns to a step of checking whether the switch S1 is turned off. In contrast, if the switch S2 is found turned on, the aperture stop mechanism 43 and the CCD 53 are controlled according to the aperture stop value and electronic shutter speed determined by the AE operation, to photograph an image of an object.

The CPU 40 controls the analog signal processor 55 to output image data of a digital form according to the image pickup signal of an analog form. After this, the CPU 40 checks whether the photographing mode is the portrait mode. If the selected photographing mode is found different from the portrait mode, then the first gamma conversion table 65b is selectively set for gamma conversion. If the selected photographing mode is found the portrait mode, then the second gamma conversion table 65c is selectively used.

The CPU 40 controls the image processor 61 to process image data in the gamma conversion according to the first or second gamma conversion table 65b or 65c. Then the image processor 61 processes the image data in the Y-C conversion. The CPU 40 controls the LCD driver 68 to cause the LCD display panel 16 to display the image in a preview manner or postview manner.

The CPU 40 controls the compression/expansion processing unit 62 to compress the image data, and controls the media controller 67 to write the compressed image data to the memory card 31. Then the sequence for the image pickup is completed.

When the shutter button 29 remains free without depression, the first gamma conversion table 65b is used to convert the image data acquired by optimized exposure, so as to cause the LCD display panel 16 to display a live image after the standard gamma conversion. When the shutter button 29 is depressed halfway, the second gamma conversion table 65c for extended dynamic range is used to convert the image data acquired by lower exposure than optimized exposure, so as to cause the display panel 16 to display a live image after the gamma conversion. Consequently, the exposure amount is kept unchanged if the mode selection dial 28 is rotated for changing the photographing mode. It is possible to suppress occurrence of flickering in the live image on the display panel 16 according to the exposure.

In the above embodiment, the mode selection dial 28 on the camera body 11 is used for selecting modes. However, it is possible to use other structures for selecting modes. For example, a selection menu pattern can be displayed on the display panel 16. An input device with a button and a cursor on the display panel 16 can be used for selecting a mode in the selection menu pattern.

In the above embodiment, the image pickup device is the CCD 53. However, a CMOS image sensor or the like may be used instead.

In the above embodiment, the equipment for image taking of the invention is the digital still camera. However, an equipment of the invention may be a camera built-in cellular telephone handset or other equipment for photographing.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image pickup equipment for recording image data by use of an imaging device for picking up an image of an object, comprising:

a mode selector for selling a selected one of plural photographing modes including a standard photographing mode and a portrait mode;

a memory for storing first and second gamma conversion tables for gradation conversion, said first gamma conversion table being used for said standard photographing mode, and said second gamma conversion table being used for said portrait mode, predetermined to extend a dynamic range of said image data characteristically in comparison with said first gamma conversion table;

an image processor for processing said image data in gradation conversion by use of said first or second gamma conversion table;

an AE evaluator for acquiring an optimized exposure amount according to brightness derived from said image data;

an exposure control unit for control of an exposure amount of said imaging device;

a controller for, when said portrait mode is set, causing said exposure control unit to set exposure lower than said optimized exposure amount being obtained, and for controlling said image processor to process portrait mode image data in gradation conversion according to said second gamma conversion table, said portrait mode image data being acquired by use of said imaging device and by setting said exposure lower;

a shutter button, operable by depression, for causing said controller to stand by upon halfway depression, and for causing said controller to record said image data upon full depression; and a display panel, controlled by said controller, for displaying an image, wherein, when said portrait mode is set and when said shutter button remains unshifted, an image of image data of said object picked up at said optimized exposure amount is displayed on said display panel in a state processed in said gradation conversion according to said first gamma conversion table, and wherein, when said shutter button is depressed halfway, an image of said portrait mode image data in an under exposed state is displayed on said display panel in a state processed in said gradation conversion according to said second gamma conversion table.

2. An image pickup equipment as defined in claim 1, wherein said second gamma conversion table has a characteristic of setting brightness high at a facial portion of a human image.

3. An image pickup equipment as defined in claim 2, wherein a gamma value according to said second gamma conversion table is smaller than a gamma value according to said first gamma conversion table.

4. An image pickup method of recording image data by picking up an image of an object, comprising steps of:

setting a selected one of plural photographing modes including a standard photographing mode and a portrait mode;

acquiring an optimized exposure amount according to brightness derived from said image data;

when said portrait mode is set, acquiring portrait mode image data by setting exposure lower than said optimized exposure amount being obtained;

processing said image data in gradation conversion by use of a selected one of first and second gamma conversion tables, said first gamma conversion table being used for said standard photographing mode, and said second gamma conversion table being used for said portrait mode, predetermined to extend a dynamic range of said image data after said gradation conversion in comparison with said first gamma conversion table, to process said portrait mode image data in gradation conversion;

executing a standby sequence for photography when it is determined that a shutter button is depressed halfway; and recording said image data when it is determined that the shutter button is fully depressed;

wherein, when said portrait mode is set and when said shutter button remains unshifted, an image of image data of said object picked up at said optimized exposure amount is displayed in a state processed in said gradation conversion according to said first gamma conversion table, and wherein, when said shutter button is depressed halfway, an image of said portrait mode image data in an under exposed state is displayed in a state processed in said gradation conversion according to said second gamma conversion table.

5. A computer-readable medium having instructions stored thereon, said instructions are read and executed by a processor for causing the processor to perform a method of recording image data, comprising the steps of:

setting a selected one of plural photographing modes including a standard photographing mode and a portrait mode;

acquiring an optimized exposure amount according to brightness derived from said image data;

when said portrait mode is set, acquiring portrait mode image data by setting exposure lower than said optimized exposure amount being obtained;

processing said image data in gradation conversion by use of a selected one of first and second gamma conversion tables, said first gamma conversion table being used for said standard photographing mode, and said second gamma conversion table being used for said portrait mode, predetermined to extend a dynamic range of said image data after said gradation conversion in comparison with said first gamma conversion table, to process said portrait mode image data in gradation conversion;

executing a standby sequence for photography when it is determined that a shutter button is depressed halfway; and recording said image data when it is determined that the shutter button is fully depressed;

wherein, when said portrait mode is set and when said shutter button remains unshifted, an image of image data of said object picked up at said optimized exposure amount is displayed in a state processed in said gradation conversion according to said first gamma conversion table, and wherein, when said shutter button is depressed halfway, an image of said portrait mode image data in an under exposed state is displayed in a state processed in said gradation conversion according to said second gamma conversion table.

* * * * *